United States Patent
Jeong et al.

(10) Patent No.: US 9,813,890 B2
(45) Date of Patent: Nov. 7, 2017

(54) METHOD AND APPARATUS FOR RECEIVING CONTENTS IN MOBILE COMMUNICATION SYSTEM

(75) Inventors: Sang Soo Jeong, Gyeonggi-do (KR); Beom Sik Bae, Gyeonggi-do (KR); Jung Je Son, Gyeonggi-do (KR); Chae Gwon Lim, Seoul (KR); Jung Shin Park, Seoul (KR); Kyung Joo Suh, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 107 days.

(21) Appl. No.: 14/005,816

(22) PCT Filed: Feb. 17, 2012

(86) PCT No.: PCT/KR2012/001224
§ 371 (c)(1),
(2), (4) Date: Sep. 17, 2013

(87) PCT Pub. No.: WO2012/124904
PCT Pub. Date: Sep. 20, 2012

(65) Prior Publication Data
US 2014/0010161 A1   Jan. 9, 2014

(30) Foreign Application Priority Data
Mar. 17, 2011   (KR) .................. 10-2011-0023719

(51) Int. Cl.
*H04H 1/00*   (2006.01)
*G06F 15/173*   (2006.01)
(Continued)

(52) U.S. Cl.
CPC .............. *H04W 8/18* (2013.01); *H04L 47/14* (2013.01); *H04L 67/2847* (2013.01);
(Continued)

(58) Field of Classification Search
CPC ........... H04W 8/18; H04W 4/06; H04W 4/18; H04W 36/00; H04L 61/1511;
(Continued)

(56) References Cited

U.S. PATENT DOCUMENTS

| | | |
|---|---|---|
| 6,941,338 B1 | 9/2005 | Madsen |
| 8,060,145 B2 | 11/2011 | Fischer |

(Continued)

FOREIGN PATENT DOCUMENTS

| | | |
|---|---|---|
| KR | 10-2004-0103680 | 12/2004 |
| KR | 10-2007-0103823 | 10/2007 |

(Continued)

OTHER PUBLICATIONS

International Search Report dated Sep. 25, 2012 in connection with International Patent Application No. PCT/KR2012/001224, 3 pages.

(Continued)

*Primary Examiner* — Edan Orgad
*Assistant Examiner* — Vanneilian Lalchinthang

(57) ABSTRACT

The present invention relates to a method and an apparatus for transmitting contents in a mobile communication network. According to one embodiment of the present invention, the method for receiving the contents of user equipment (UE) in a mobile communication system equipped with a local server which is connected to a base station (eNB) and copies partial contents of an external content server and maintains the copied contents, can include: a content determination step of determining whether the selected contents are the contents provided from the local server when a content selection input is received; a request transmission step of transmitting a content transmission request message to the base station (eNB) when the contents are the contents provided from the local server; and a content reception step of receiving the contents from the base station. According to (Continued)

one embodiment of the present invention, the present invention provides the method and the apparatus for efficiently receiving the contents which reduce resources used for receiving the contents and shorten a delay time.

20 Claims, 12 Drawing Sheets

(51) Int. Cl.
  *H04W 36/00* (2009.01)
  *H04W 8/18* (2009.01)
  *H04L 12/801* (2013.01)
  *H04W 4/18* (2009.01)
  *H04L 29/08* (2006.01)
  *H04L 29/12* (2006.01)

(52) U.S. Cl.
  CPC ........... *H04W 4/18* (2013.01); *H04L 61/1511* (2013.01); *H04L 61/1588* (2013.01)

(58) Field of Classification Search
  CPC . H04L 61/1588; H04L 47/14; H04L 67/2847; H04B 7/00; G06F 15/173
  USPC ........................................................ 370/328
  See application file for complete search history.

(56) References Cited

U.S. PATENT DOCUMENTS

| | | | |
|---|---|---|---|
| 8,111,630 | B2 | 2/2012 | Kovvali et al. |
| 8,898,221 | B2 | 11/2014 | Melander et al. |
| 2005/0075107 | A1* | 4/2005 | Wang et al. ............... 455/435.1 |
| 2007/0127642 | A1* | 6/2007 | Bae et al. .................. 379/88.13 |
| 2007/0232221 | A1* | 10/2007 | Miyata .................. H04H 60/42 455/3.01 |
| 2008/0288458 | A1 | 11/2008 | Sun et al. |
| 2009/0163190 | A1* | 6/2009 | Helferich ................... 455/414.3 |
| 2009/0265235 | A1* | 10/2009 | Ha et al. ......................... 705/14 |
| 2010/0008290 | A1* | 1/2010 | Fischer ......................... 370/328 |
| 2010/0029275 | A1* | 2/2010 | Bosch ................... H04W 28/18 455/436 |
| 2010/0034089 | A1 | 2/2010 | Kovvali et al. |
| 2010/0272050 | A1* | 10/2010 | Lim et al. ...................... 370/329 |
| 2011/0131341 | A1* | 6/2011 | Yoo et al. ...................... 709/237 |
| 2011/0283017 | A1* | 11/2011 | Alkhatib ............. H04L 12/4641 709/244 |
| 2011/0320554 | A1 | 12/2011 | Melander et al. |
| 2012/0023147 | A1* | 1/2012 | Kim et al. ..................... 707/827 |
| 2012/0047231 | A1* | 2/2012 | Herbeck ............... G06F 9/5055 709/219 |
| 2012/0206645 | A1* | 8/2012 | Ozawa ....................... 348/425.3 |

FOREIGN PATENT DOCUMENTS

| | | |
|---|---|---|
| KR | 10-2009-0109645 | 10/2009 |
| KR | 10-2010-0015111 | 2/2010 |
| WO | WO 01/16788 A2 | 3/2001 |
| WO | WO 2007/067176 A2 | 6/2007 |
| WO | WO 2010/106390 A1 | 9/2010 |

OTHER PUBLICATIONS

Written Opinion of International Searching Authority dated Sep. 25, 2012 in connection with International Patent Application No. PCT/KR2012/001224, 3 pages.

Extended European Search Report dated Mar. 5, 2015 in connection with European Patent Application No. 12758238.5; 7 pages.

\* cited by examiner

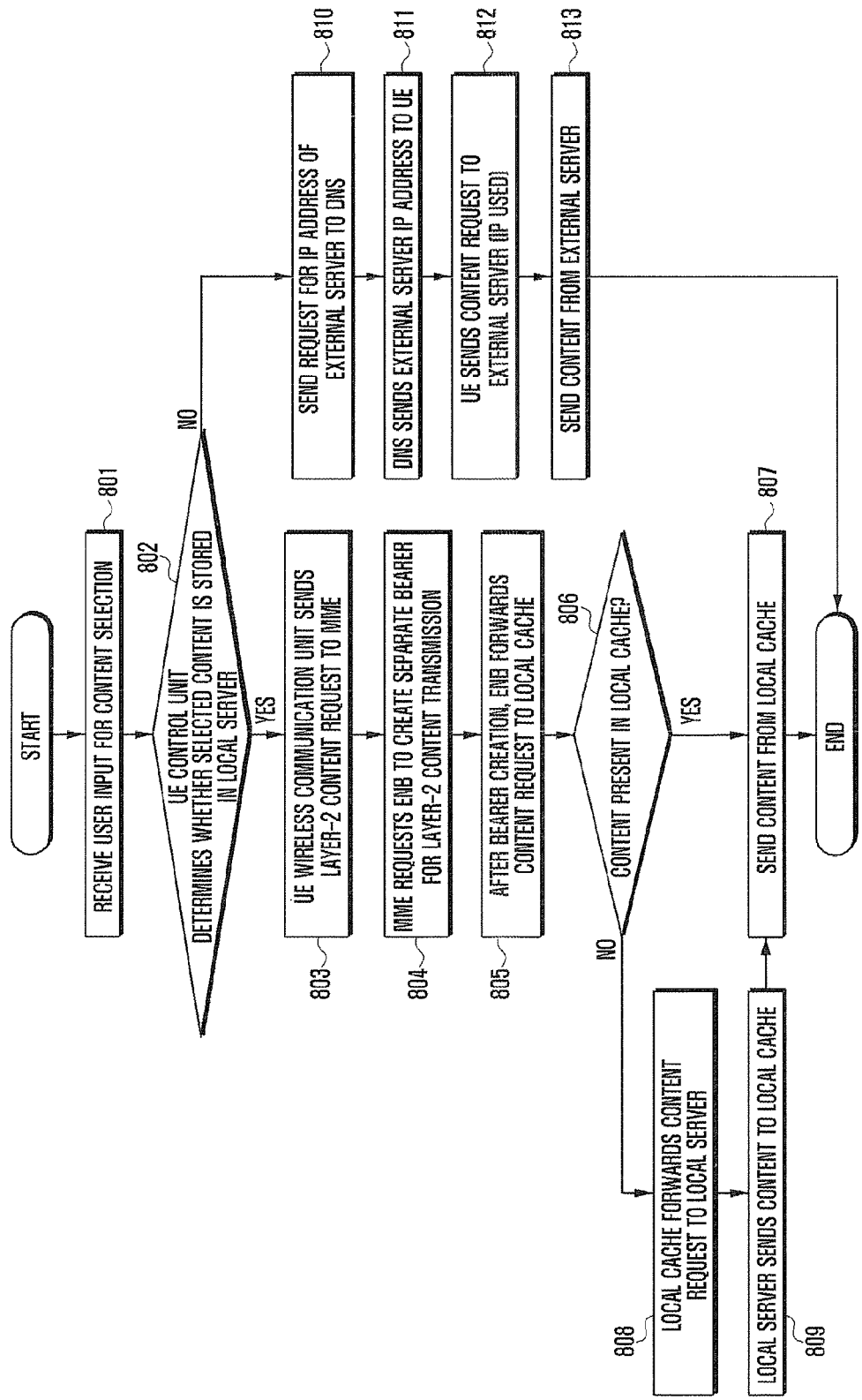

METHOD AND APPARATUS FOR RECEIVING CONTENTS IN MOBILE COMMUNICATION SYSTEM

TECHNICAL FIELD

The present disclosure relates to a method and apparatus for receiving content in a mobile communication system. More particularly, the present disclosure relates to a content reception method and apparatus that reduce communication resources and delay time needed for content reception.

BACKGROUND ART

In general, mobile communication systems have been developed to provide communication services while guaranteeing user mobility. Thanks to rapid technical advancement, mobile communication systems are capable of providing not only voice communication services but also high-speed data communication services.

In recent years, the 3GPP (3rd Generation Partnership Project) has developed specifications for Long Term Evolution (LTE) as a next generation mobile communication system. LTE aims to realize high-speed packet based communication supporting a maximum data rate of about 100 Mbps exceeding existing data rates. To achieve this, various approaches have been considered, such as reducing the number of nodes on a communication path through simplification of the network architecture and bringing wireless protocols as close as possible to wireless channels.

Meanwhile, recent advances in Internet and mobile communication technology have enabled transmission of a variety of content through multimedia mobile communication systems. Users wish to receive various types of multimedia content. Multimedia content may include videos, songs, photographs, web browsing, instant messaging and the like. In multimedia content services, shorter transmission delay ensures better service quality to users.

However, when multiple users request the same content, the content is separately and repeatedly transmitted to the users through the TCP/IP protocol and Internet. This type of transmission may cause waste of resources of the mobile communication system and increase content delivery latency.

DISCLOSURE OF INVENTION

Technical Problem

Aspects of the present disclosure are to address the above mentioned problems and/or disadvantages. Accordingly, an aspect of the present disclosure is to provide an efficient content reception method and apparatus that can reduce usage of resources needed for content reception and reduce content delivery latency.

Solution to Problem

In accordance with an aspect of the present disclosure, there is provided a method of content reception for a user equipment (UE) in a mobile communication system equipped with a local server that is connected to an Enhanced Node B (eNB) and stores copied versions of some pieces of content stored in an external server. The method includes: determining, when content selection input is received, whether the selected content is stored in the local server; transmitting, when the selected content is determined to be stored in the local server, a content request message to the eNB; and receiving content corresponding to the content request message from the eNB.

In accordance with another aspect of the present disclosure, there is provided a user equipment capable of content reception in a mobile communication system equipped with a local server that is connected to an Enhanced Node B (eNB) and stores copied versions of some pieces of content stored in an external server. The user equipment includes: a control unit to determine, when content selection input is received, whether the selected content is stored in the local server; and a wireless communication unit to transmit, when the selected content is determined to be stored in the local server, a content request message to the eNB, and receive content corresponding to the content request message from the eNB.

Other aspects of embodiments will become apparent from the following detailed description and the annexed drawings.

Advantageous Effect of Invention

In a feature of the present disclosure, it is possible to provide an efficient content reception method and apparatus that can reduce usage of resources needed for content reception and reduce content delivery latency.

BRIEF DESCRIPTION OF DRAWINGS

FIG. 8 is a flowchart of a procedure for content transmission according to a third embodiment of the present disclosure.

MODE FOR THE INVENTION

Figure 1:
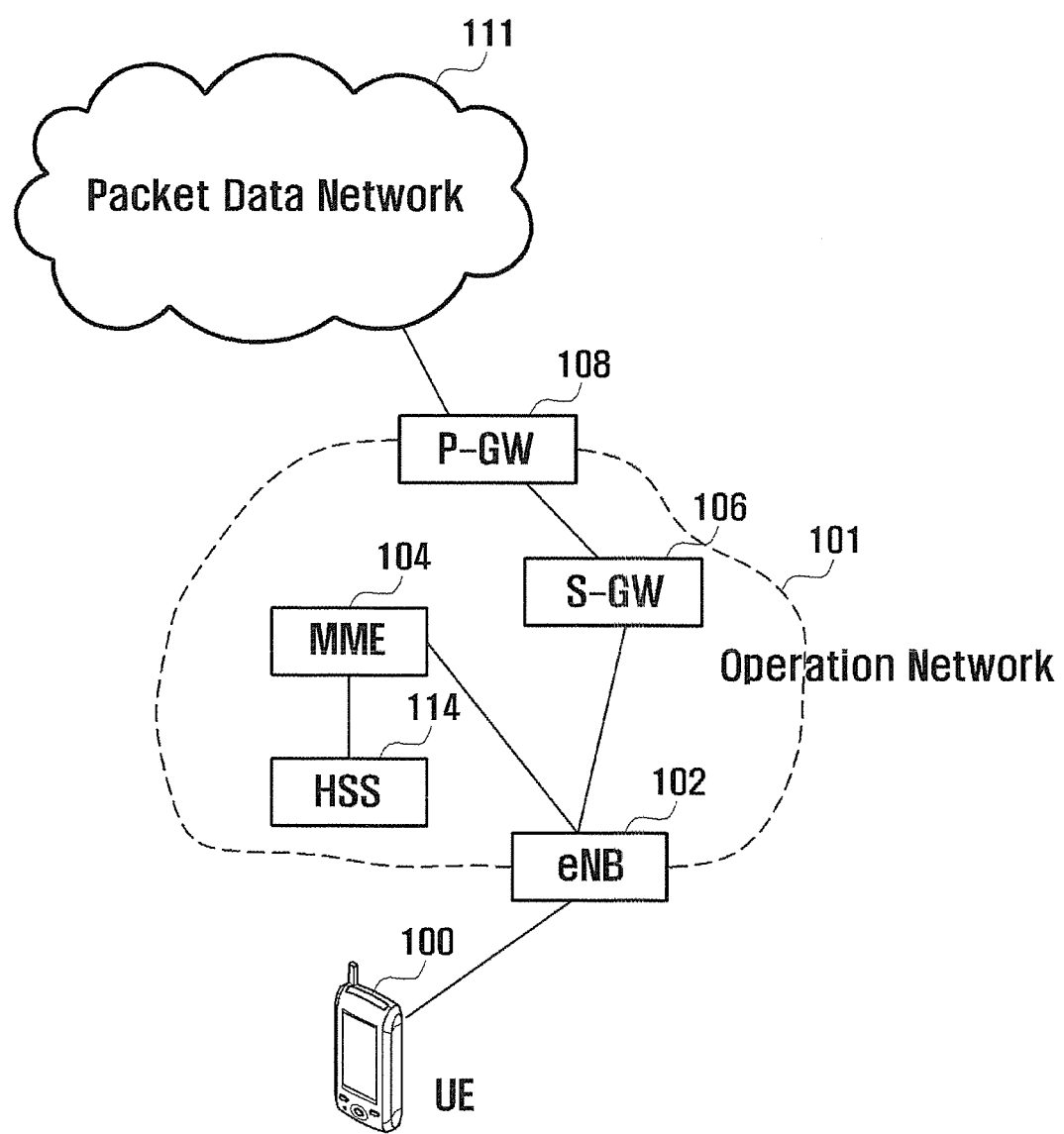
FIG. 1 illustrates a network architecture of a wireless communication system to which the present disclosure is applied.

Hereinafter, embodiments of the present disclosure are described in detail with reference to the accompanying drawings.

Detailed descriptions of well-known functions and structures incorporated herein may be omitted to avoid obscuring the subject matter of the present disclosure.

In the drawings, some elements are exaggerated, omitted or only outlined in brief, and thus may be not drawn to scale. The same reference symbols are used throughout the drawings to refer to the same or like parts.

Aspects, advantages and salient features of the present disclosure will become apparent from the following detailed description taken in conjunction with the annexed drawings. It should be apparent to those skilled in the art that the following description of various embodiments of the present disclosure is provided for illustration purpose only and not for the purpose of limiting the present disclosure as defined by the appended claims and their equivalents.

Hereinafter, a content reception method and apparatus will be described as embodiments of the present disclosure with reference to the drawings.

FIG. 1 illustrates a network architecture of a wire less communication system to which the present disclosure is applied. Referring to FIG. 1, the wireless communication system may include a user equipment (UE) 100, an operator network 101, and a packet data network 111.

The UE 100 utilizes voice or data services. Here, the UE 100 may be a mobile phone, a laptop computer, a tablet computer, a digital photo frame, a vending machine, a CCTV, or a sensor such as an electrometer sensor, water meter sensor, seismic sensor or fire alarm sensor of a building. The operator network 101 provides voice or data services to a UE 100. The operator network 101 supports communication between UEs 100. The operator network 101 receives packet data from the UE 100 and uploads the packet data to the packet data network 111, and downloads packet data from the packet data network 111 and sends the packet data to the UE 100. The packet data network 111 manages packet data sent to or received from the UE 100. Here, the packet data network 111 may include a management server to maintain packet data or to maintain UE setting information for packet data provision.

The operator network 101 may include an Enhanced Node B (eNB) 102, a Mobility Management Entity (MME) 104, a Serving Gateway (S-GW) 106, and a Packet Data Network Gateway (P-GW) 108.

The eNB 102 is a base station controlling a cell. The cell may be a cell of a cellular system. The eNB 102 is a base station managing and controlling a cell. The eNB 102 may be connected to the UE 100 through a radio channel and controls radio resources. For example, the eNB 102 may broadcast cell control information as system information and may allocate radio resources to exchange data or control information with the UE 100. Here, the broadcast system information may include at least one of Public Land Mobile Network Identifier (PLMN ID) as information on the operator supported by the eNB, eNB Cell Global ID (ECGI) as eNB cell information, or Tracking Area ID (TAI) as information on the tracking area to which each cell belongs. The eNB 102 may collect channel measurement information for the current cell and neighboring cells from the UE 100 and analyze the channel measurement information to determine and command handover. To this end, the eNB 102 may include control protocols related to radio resource management such as Radio Resource Control Protocol.

The MME 104 manages the UE 100 in idle mode and selects the P-GW 108 and S-GW 106. The MME 104 performs functions related to roaming and authentication. The MME 104 handles a bearer signal generated by the UE 100.

The S-GW 106 may act as a mobility anchor for inter-eNB handover or 3GPP inter-RAT handover.

The P-GW 108 allocates an Internet Protocol (IP) address to the UE 100, performs packet data-related functions of the core network, and acts as the anchor for mobility between 3GPP and non-3GPP radio networks. In addition, the P-GW 108 determines the bearer band for a subscriber and performs packet data forwarding and routing.

The operator network 101 may further include a Home Subscriber Server (HSS) 114. The HSS 114 stores subscription information for each UE 100. When a UE 100 connects to the network, the HSS 114 sends subscription information of the UE 100 to the MME 104, so that the MME 104 may use the subscription information to control the UE 100.

When connected to the eNB 102, the UE 100 may access the packet data network 11 though a data transfer path established via the eNB 102, S-GW 106, and P-GW 108. After connection establishment with the eNB 102, the UE 100 transmits a NAS Request message to the MME 104. Here, the NAS Request message may be one of Attach Request message, Tracking Area Update Request message, and Service Request message.

Specific functions performed by mobile communication system entities for the present disclosure are described in detail later with reference to FIGS. 5A to 11.

Figure 2:
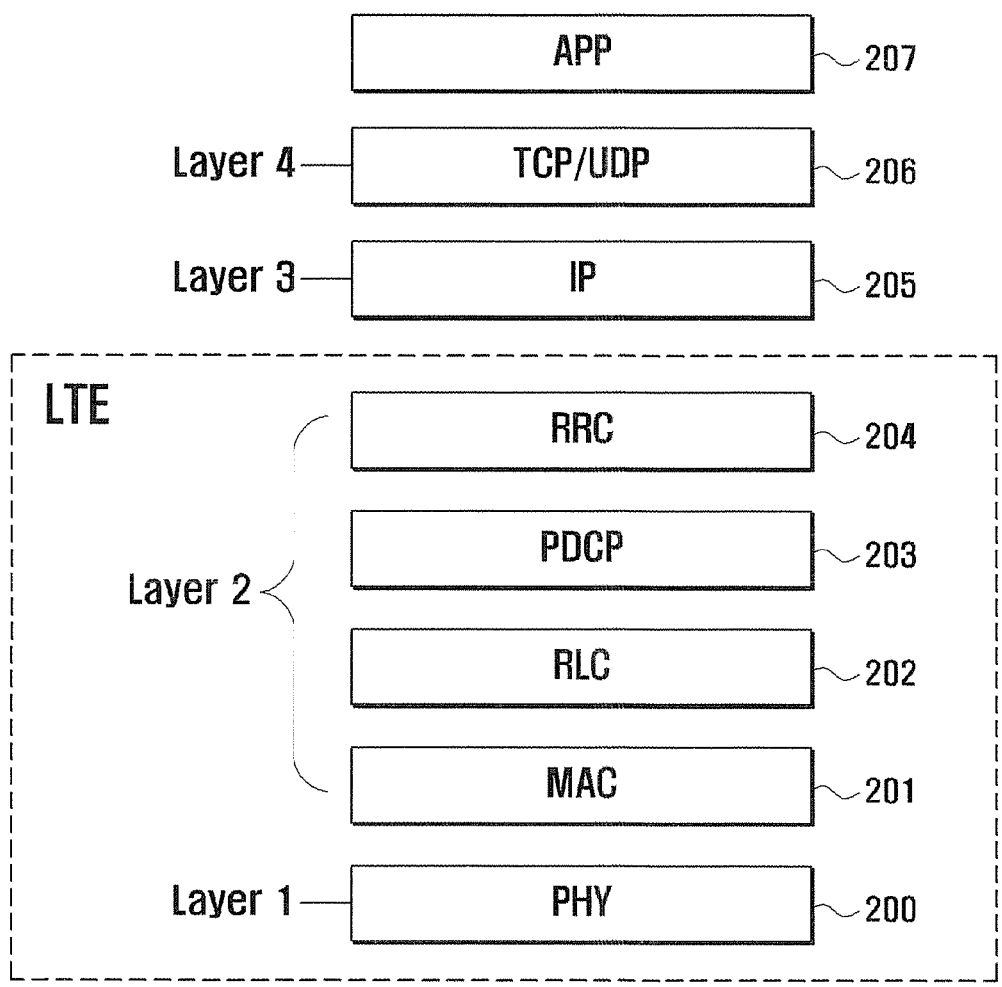
FIG. 2 illustrates a hierarchy of wireless protocols used in the present disclosure.

FIG. 2 illustrates a hierarchy of wireless protocols used in the present disclosure.

Referring to FIG. 2, the wireless protocol stack of the LTE system includes Radio Resource Control (RRC) 204, Packet Data Convergence Protocol (PDCP) 203, Radio Link Control (RLC) 202, Medium Access Control (MAC) 201, and Physical (PHY) 200. RRC 204 manages allocation of resources between eNB and UE and manages connection therebetween, and is not used for regular data transfer unlike other LTE protocols. PDCP 203 performs security operation, header compression and the like. RLC 202 reconfigures PDCP PDUs (Packet Data Unit) to a suitable size to conduct ARQ operations. MAC 201 is connected to multiple RLC layer devices in a UE, and multiplexes RLC PDUs into MAC PDUs or demultiplexes MAC PDUs into RLC PDUs. PHY 200 converts higher layer data into OFDM symbols by means of channel coding and modulation and transmits the OFDM symbols through a wireless channel, or converts OFDM symbols received through a wireless channel into higher layer data by means of demodulation and channel decoding and forwards the data to higher layers. At the transmitting side, for a given protocol entity, Service Data Unit (SDU) refers to unit data that is input to the protocol entity, and Protocol Data Unit (PDU) refers to unit data that is output by the protocol entity.

Meanwhile, Transmission Control Protocol (TCP) 206 or User Datagram Protocol (UDP) 206 is used for end-to-end transmission and reception of user data through LTE radio networks, and Internet Protocol (IP) 206 is used to assign user addresses. Various user applications (APP) 207 operate based upon these protocols. APP 207 may include applications such as a web browser and video player for a variety of services.

Figure 3:
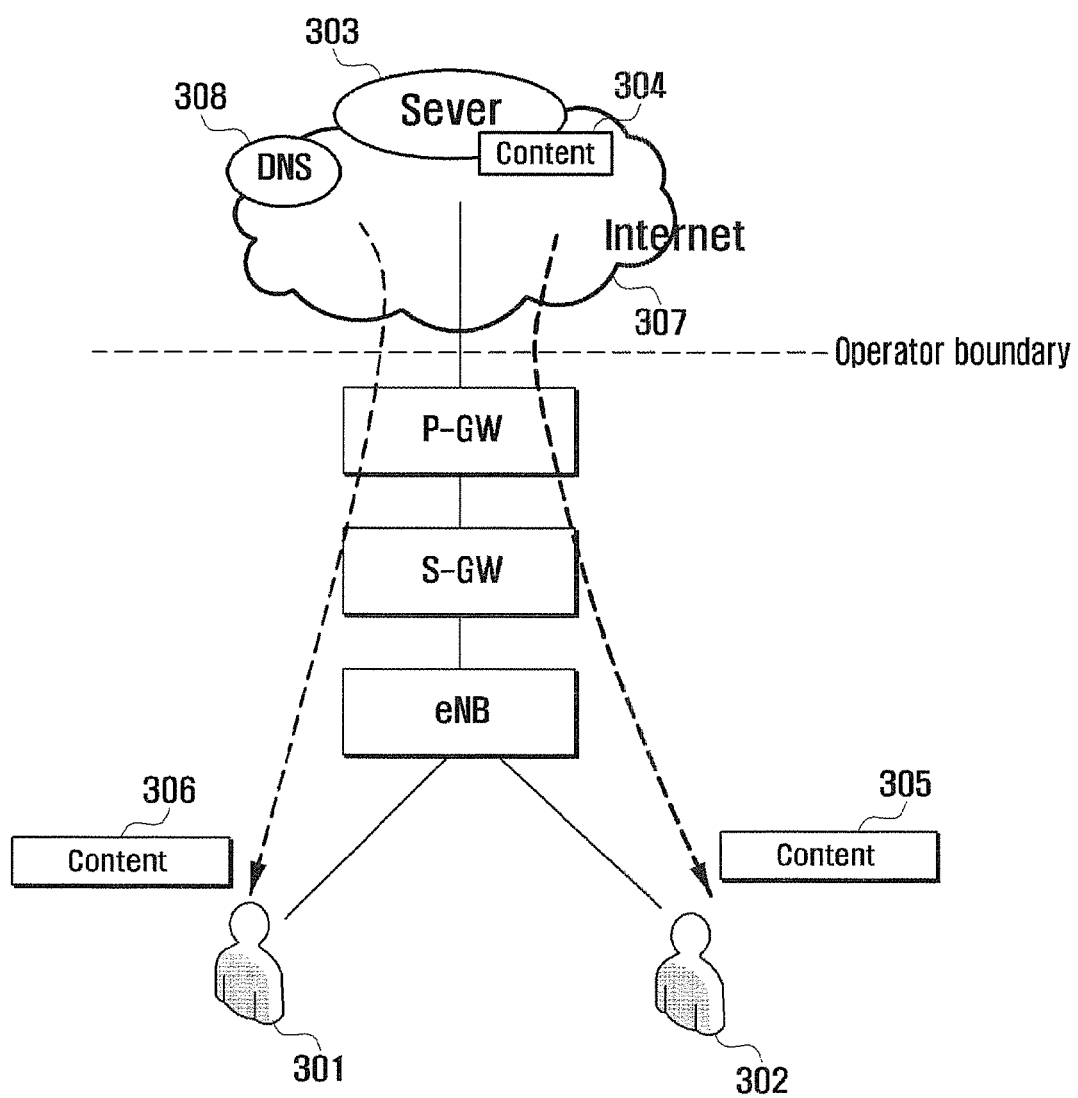
FIG. 3 depicts a situation where two users 301 and 302 receive content 304 from an external server 303 through a mobile communication system.

FIG. 3 depicts a situation where two users 301 and 302 receive content 304 from an external server 303 through a mobile communication system.

In an existing mobile communication system, when two users request the same content 304, the content 304 is separately and repeatedly transmitted as content 305 and content 306. Such repeated transmission may cause waste of backhaul resources in the mobile communication system. In addition, the content 304 is delivered to users via multiple routers on the Internet 307 and through LTE radio networks, and a DNS 308 is also used, lengthening a delay time for delivering the content 304.

Figure 4:
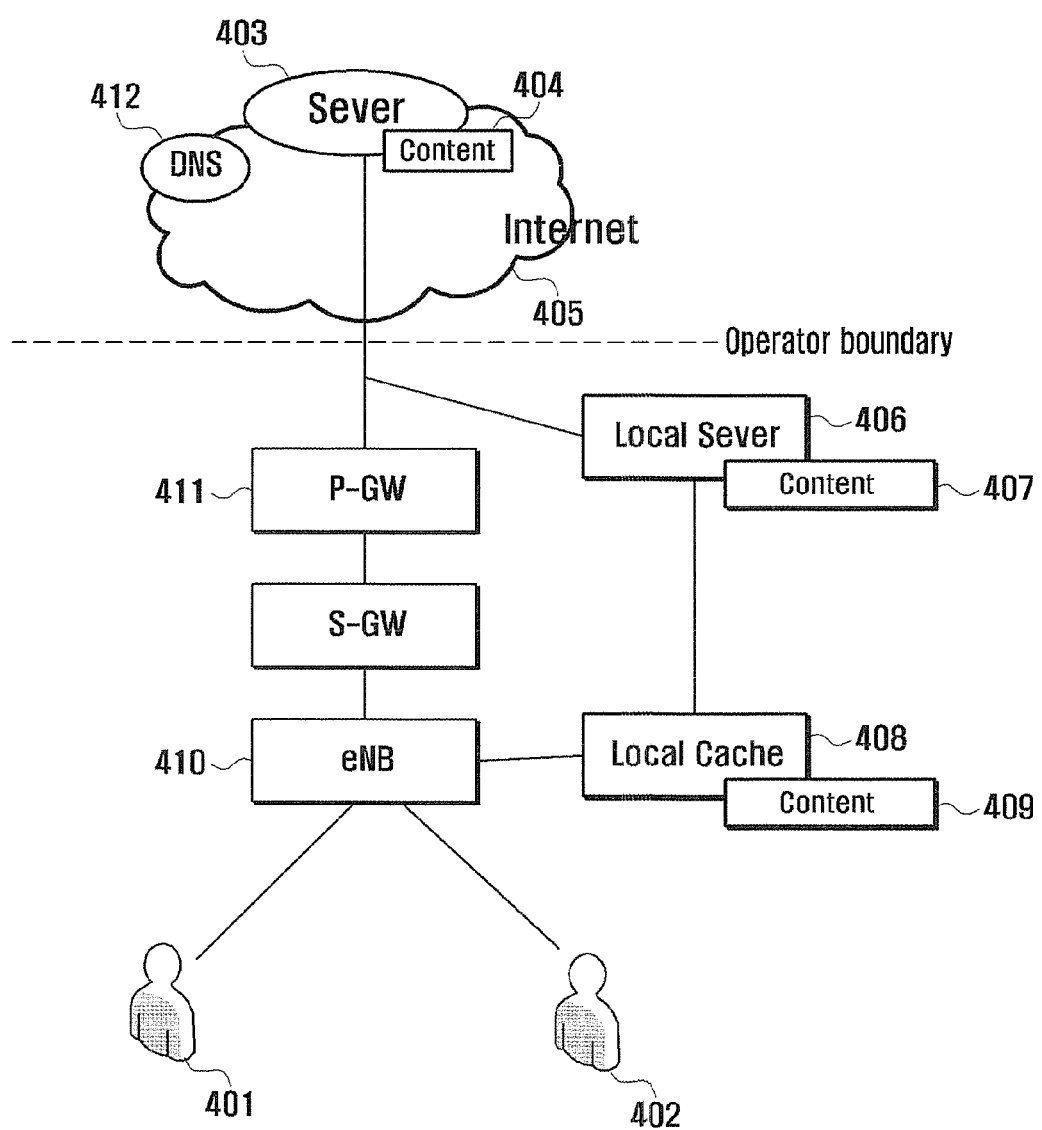
FIG. 4 illustrates a network architecture of a mobile communication system according to an embodiment of the present disclosure.

FIG. 4 illustrates a network architecture of a mobile communication system according to an embodiment of the present disclosure.

To remedy inefficiency described in FIG. 3, which may worsen with explosive increases in content transmission, the present disclosure introduces a wireless network architecture shown in FIG. 4. Specifically, grafting the concept of content delivery networks (CDN) onto mobile communication, a local server 406 storing content is deployed in the operator LTE network. Use of the local server 406 enables transmission of content to users within the LTE network without passing through the Internet 405, effectively solving the problem of a long transmission path in the case of content transmission via the Internet 405.

In addition, a local cache 408 is arranged and utilized in the eNB 410. The local cache 408 stores some of content delivered to a UE 401. Later, when a transmission request is issued for content stored in the local cache 408, the requested content stored in the local cache 408 is immediately delivered to a UE 402 through the eNB 410. This scheme is efficient because content stored in the local cache 408 can be directly transmitted, skipping access to the local server 406 or external server 403.

If user-requested content is present in the local cache 408, transmission delay may be reduced in comparison to content delivery from the server 403 placed outside the LTE radio network or from the local server 406 near to the P-GW 411. This scheme may save network resources because the Internet or the LTE core network (i.e. a path from the P-GW to the eNB) is not used.

Various embodiments of the present disclosure relate mainly to systems employing both the local server 406 and the local cache 408. However, it may be apparent to those skilled in the art that the subject matter of the present disclosure can be applied to other communication systems having either the local server 406 or the local cache 408 without much modification.

Figure 5:
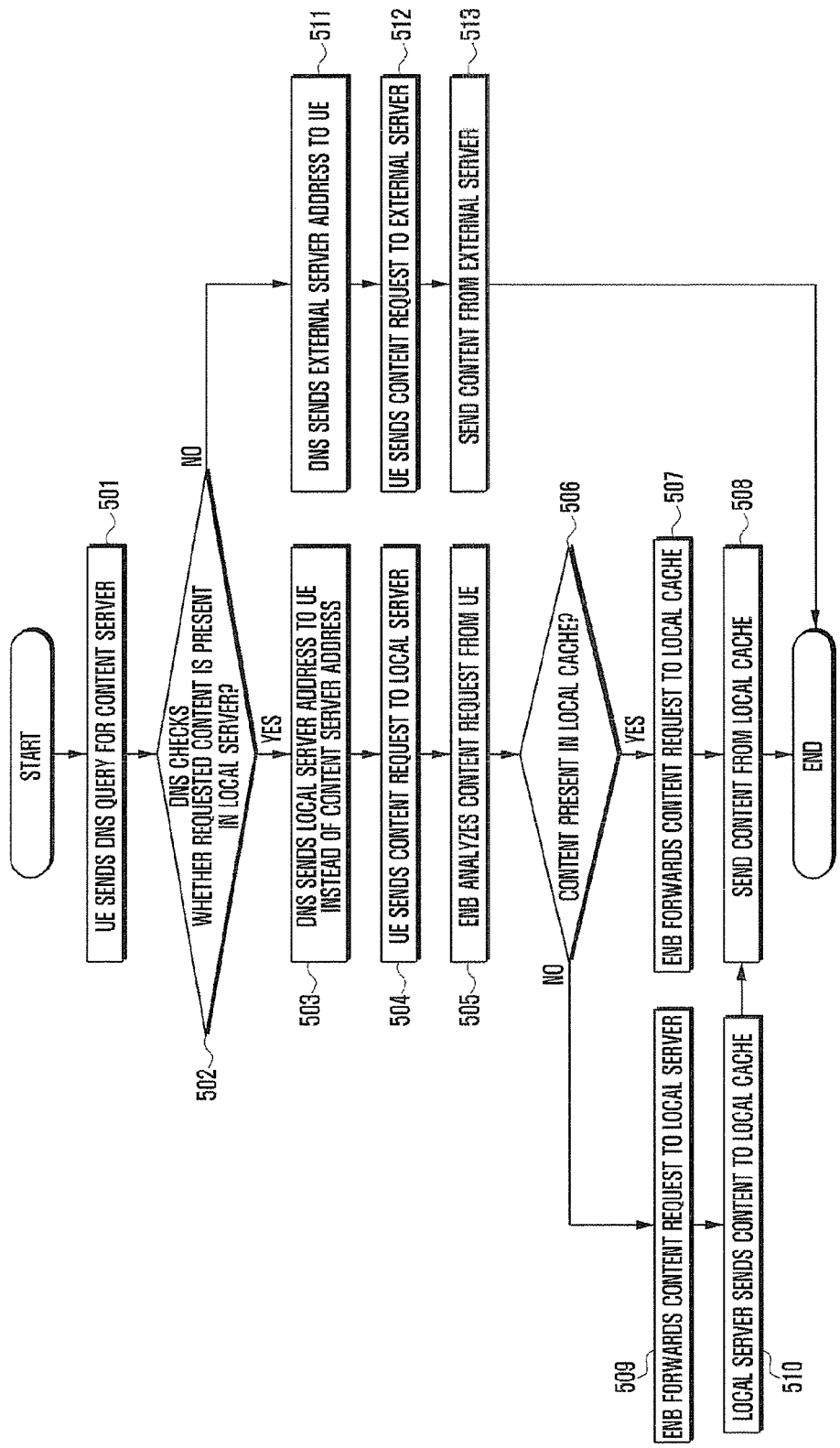
FIG. 5 is a flowchart of a procedure for content transmission according to a first embodiment of the present disclosure.

FIG. 5 is a flowchart of a procedure for content transmission according to a first embodiment of the present disclosure.

At operation 501, a UE 401 sends a DNS query to the DNS 412 to identify an address of the external server 403 storing content 404. To send a request for content 404 indicated by a user application 207, the UE 401 has to obtain an address of the external server 403 in which the content 404 is stored.

At operation 502, upon reception of the DNS query, the DNS 412 checks whether the requested content is present in the local server 406 in the operator network. If the requested content is present in the local server 406, the procedure proceeds to operation 503 and content delivery is initiated from the local server 406. If the requested content is not present in the local server 406, the procedure proceeds to operation 511 and content delivery is initiated from the external server 403.

The DNS 412 may determine whether content is present in the local server 406 on the basis of domain names. For example, in the event that all content associated with a domain "*.samsung.com" is stored in the local server 406, when the DNS 412 receives a DNS query referring to the domain "*.samsung.com", it may determine that requested content is present in the local server 406. To this end, the DNS 412 may store a list of domain names associated with content stored in the local server 406. Alternatively, the DNS 412 may store a mapping between domain names associated with content stored in the local server 406 and an IP address of the local server 406 and may use the mapping to determine whether requested content is present in the local server 406.

At operation 503, the DNS 412 sends an IP address of the local server 406 to the UE 401 instead of sending an address of the external server 403. As the same content is stored in the local server 406, the address of the local server 406, which is more rapidly accessible, is transmitted for efficient content delivery.

At operation 504, the UE 401 sends a content request message via the eNB 410 to the local server 406. At operation 505, the eNB 410 analyzes the received content request message. At operation 506, the eNB 410 checks whether the requested content is present in the local cache 408.

Upon determining that the requested content is present in the local cache 408, the procedure proceeds to operation 507 at which the eNB 410 forwards the content request message to the local cache 408 other than the local server 406. At operation 508, the local cache 408 sends a copied version 409 of the stored content to the UE 401.

Upon determining that the requested content is not present in the local cache 408, the procedure proceeds to operation 509 at which the eNB 410 forwards the content request message to the local server 406. At operation 510, the local server 406 sends a copied version 407 of the content corresponding to the content request message to the local cache 408. At operation 508, the local cache 408 sends a copied version 409 of the received content to the UE 401.

For transmission of the content request message at operation 503 or content transmission at operation 507, the LTE protocols 200 to 204, the IP protocol 206 for address assignment, and the TCP/UDP protocol 205 for data packet transfer may all be used.

In the present disclosure, it should be noted that user perceived latency can be reduced because content can be directly delivered from the local cache 408 or local server 406 to the UE 401 without passing through the Internet 405. In addition, when content not present in the local cache 408 is requested, the requested content is received from the local server 406 and saved in the local cache 408. Later, when the eNB 410 receives a content request message for the same content from, for example, a UE 402, a corresponding copied version stored in the local cache 408 can be immediately delivered to the UE 402. Hence, load on the LTE core network, starting from the eNB 410 via the P-GW 411 leading to the local server 406, may be greatly reduced.

In the present disclosure, to store content in the local cache 408, it may be necessary to remove existing stored content owing to limited capacity of the local cache 408. In this case, various cache replacement policies such as Least Recently Used (LRU) and Most Recently Used (MRU) may be utilized.

At operation 511, the DNS 412 sends an address of the external server 403 to the UE 401. As requested content is not stored in the local server 406, an address of the external server 403 is sent according to a regular procedure. At operation 512, the UE 401 sends a content request message to the external server 403 by use of the received address. At operation 513, the UE 401 receives content corresponding to the content request message from the external server 403.

The first embodiment described above can heighten content transmission performance in comparison to an existing communication network. However, in the first embodiment, as the DNS 412 deals with content transmission requests, network configuration expenses for addition of such a function to the existing DNS or modification of the same may be incurred or a transmission delay may occur owing to DNS queries and responses. In addition, as the TCP/UDP protocol 205 and IP protocol 206 are used similarly to a case of content delivery via the Internet 307, resource usage efficiency may be lowered owing to protocol headers added to individual packets.

Figure 6:
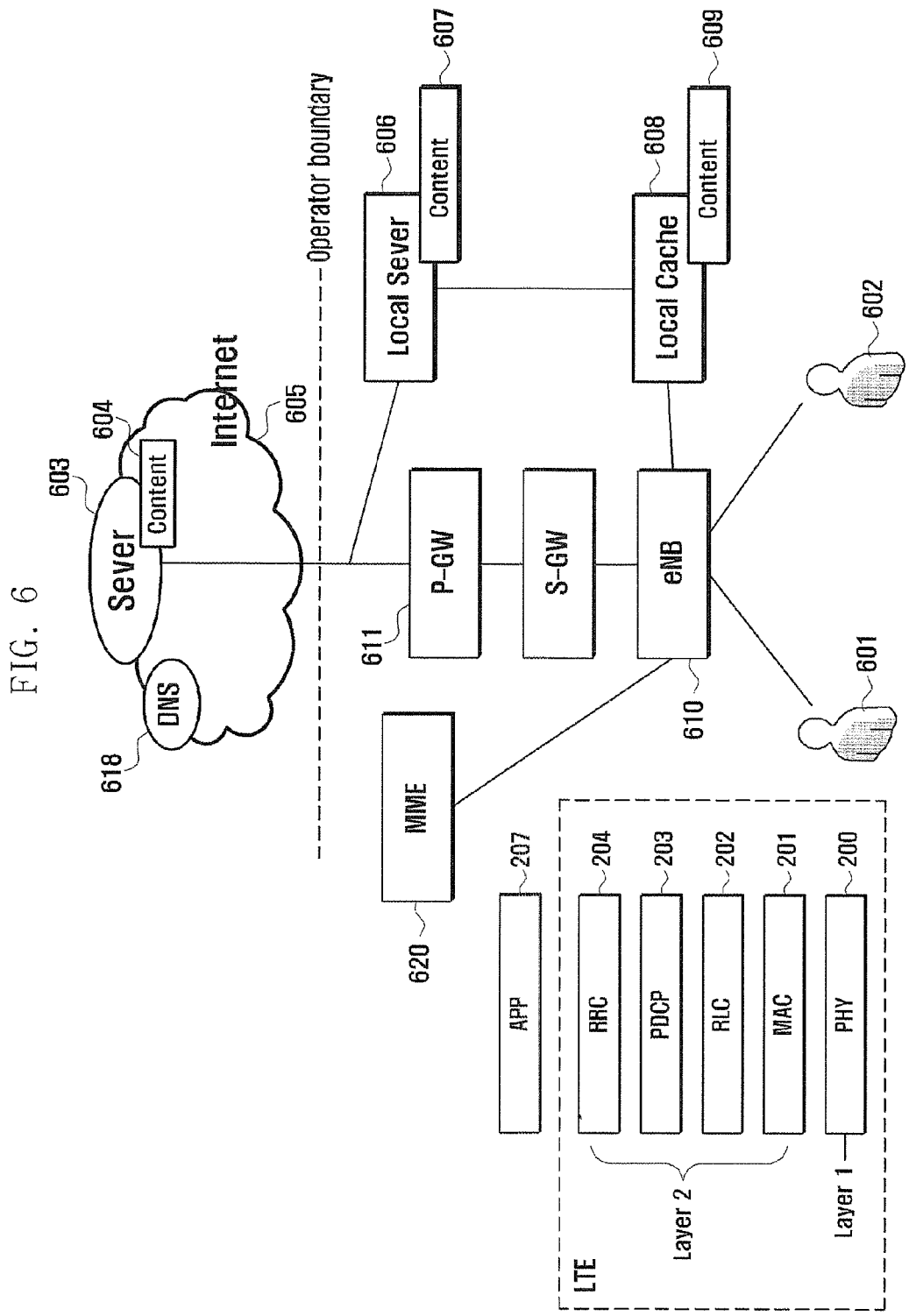
FIG. 6 illustrates a network architecture of a mobile communication system according to a second embodiment of the present disclosure.

FIG. 6 illustrates a network architecture of a mobile communication system according to a second embodiment of the present disclosure.

The second embodiment of the present disclosure may provide additional performance gain in content transmission in comparison to the network architecture of the first embodiment shown in FIG. 4.

Although the network architecture in FIG. 6 may be similar to that of FIG. 4, operations of UE 601 or 602 and DNS 618 differ from those of UE 401 or 402 and DNS 412 in FIG. 4.

In the first embodiment of FIG. 4, as the DNS 412 determines whether to use the local server 406 or the local cache 408, it is necessary for the DNS to have a new function. On the contrary, in the second embodiment, as whether to use a local server 606 or a local cache 608 is directly determined by a UE 601 or 602, the existing DNS configuration need not be changed. Additionally, in the first embodiment, as described before, when the local server 406 or the local cache 408 is used, the UE 401 or 402 still uses the TCP/UDP and IP protocols. On the contrary, in the second embodiment, when the UE 601 or 602 uses the local server 606 or the local cache 608, as data and signals are exchanged through the layer 2, the TCP/UDP and IP protocols 206 and 205 are not used.

A DNS 618 and an external server 603 are located on the Internet 605. The external server 603 may provide content 604. A P-GW 611, eNB (610), local server 606, copied version 607 of content in the local server 606, local cache 408, and copied version 609 of content in the local cache 408 have the same or similar feature as corresponding entities in the embodiment of FIG. 4 except for the differences described above.

Figure 7A:
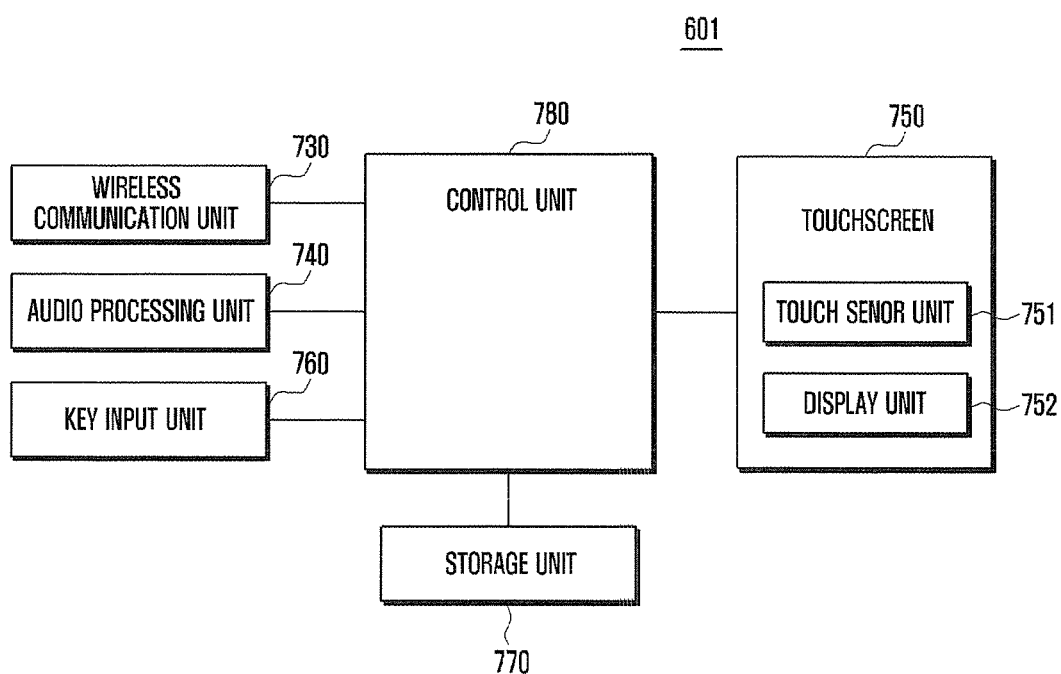
FIG. 7A is a block diagram of a UE 601 according to the second embodiment of the present disclosure.

FIG. 7A is a block diagram of a UE 601 according to the second embodiment of the present disclosure.

The UE 601 according to the second embodiment of the present disclosure may include a wireless communication unit 730, an audio processing unit 740, a touchscreen 750, a key input unit 760, a storage unit 770, and a control unit 780.

The wireless communication unit 730 performs data transmission and reception for wireless communication of the UE 601. The wireless communication unit 730 may include a radio frequency (RF) transmitter for upconverting the frequency of a signal to be transmitted and amplifying the signal, and an RF receiver for low-noise amplifying a received signal and downconverting the frequency of the received signal. The wireless communication unit 730 may receive data through a radio channel and forward the data to the control unit 780, and send data from the control unit 780 through a radio channel.

Operations of the wireless communication unit 730 according to the second embodiment are described in detail with reference to FIG. 7B and FIGS. 8 to 11.

The audio processing unit 740 may include a coder/decoder (codec). The codec may have a data codec for processing packet data and the like, and an audio codec for processing an audio signal such as a voice signal. The audio processing unit 740 converts a digital audio signal into an analog audio signal through the audio codec to reproduce the analog audio signal through a speaker, and converts an analog audio signal from a microphone MIC into a digital audio signal through the audio codec.

The touchscreen 750 includes a touch sensor unit 751 and a display unit 752. The touch sensor unit 751 senses user touch input. The touch sensor unit 751 may include a touch sensor using capacitive overlay, resistive overlay, or infrared beams, or a pressure sensor. In the present disclosure, a sensor of any type capable of sensing contact with an object or pressure caused by an object may be included in the touch sensor unit 751. The touch sensor unit 751 senses user touch input, generates a sensing signal corresponding to the touch input, and sends the sensing signal to the control unit 780. The sensing signal includes coordinate data of touch input. When the user makes a touch and move gesture, the touch sensor unit 751 generates a sensing signal containing coordinate data of the touch and movement path and sends the sensing signal to the control unit 780.

Particularly, in one embodiment, the touch sensor unit 751 may sense user input for displaying a group of object items in a spread or extended form. Such user input may be a touch (multi-touch) gesture or a drag gesture.

The display unit 752 may be realized using Liquid Crystal Display (LCD) devices, Organic Light Emitting Diodes (OLED), Active Matrix Organic Light Emitting Diodes (AMOLED) or the like. The display unit 752 provides the user with various visual information such as menus of the UE 601, input data, and function setting information. The display unit 752 may output a boot screen, idle screen, menu screen, call handling screen, and application screen for the UE 601.

As described above, the UE 601 of the present disclosure may include a touchscreen. However, embodiments of the present disclosure may be applied not only to UEs having a touchscreen but also to UEs not having a touchscreen. When the present disclosure is applied to a UE not having a touchscreen, the function of the touchscreen 750 in FIG. 7A may be confined to that of the display unit 752.

The key input unit 760 generates an input signal corresponding to user key manipulation for controlling the UE 601 and sends the input signal to the control unit 780. The key input unit 760 may include a keypad composed of numeric keys and direction keys, and function keys formed on a surface of the UE 601. When the UE 601 can be fully manipulated for embodiments of the present disclosure using only the touchscreen 750, the key input unit 760 may be omitted.

The storage unit 770 stores programs and data necessary for operation of the UE 601, and may be divided into a program section and a data section. The program section may store a program for controlling the overall operation of the UE 601, an operating system (OS) for booting the UE 601, an application program for playing multimedia content, and other application programs for optional functions of the UE 601 such as a camera function, sound reproduction, image or moving image playback. The data section may store data generated in the course of using the UE 601, such as images, moving images, phonebook entries and audio data.

The control unit 780 controls overall operation of individual components of the UE 601.

Operations of the control unit are described in detail later with reference to FIG. 7B and FIGS. 8 to 11.

Figure 7B:
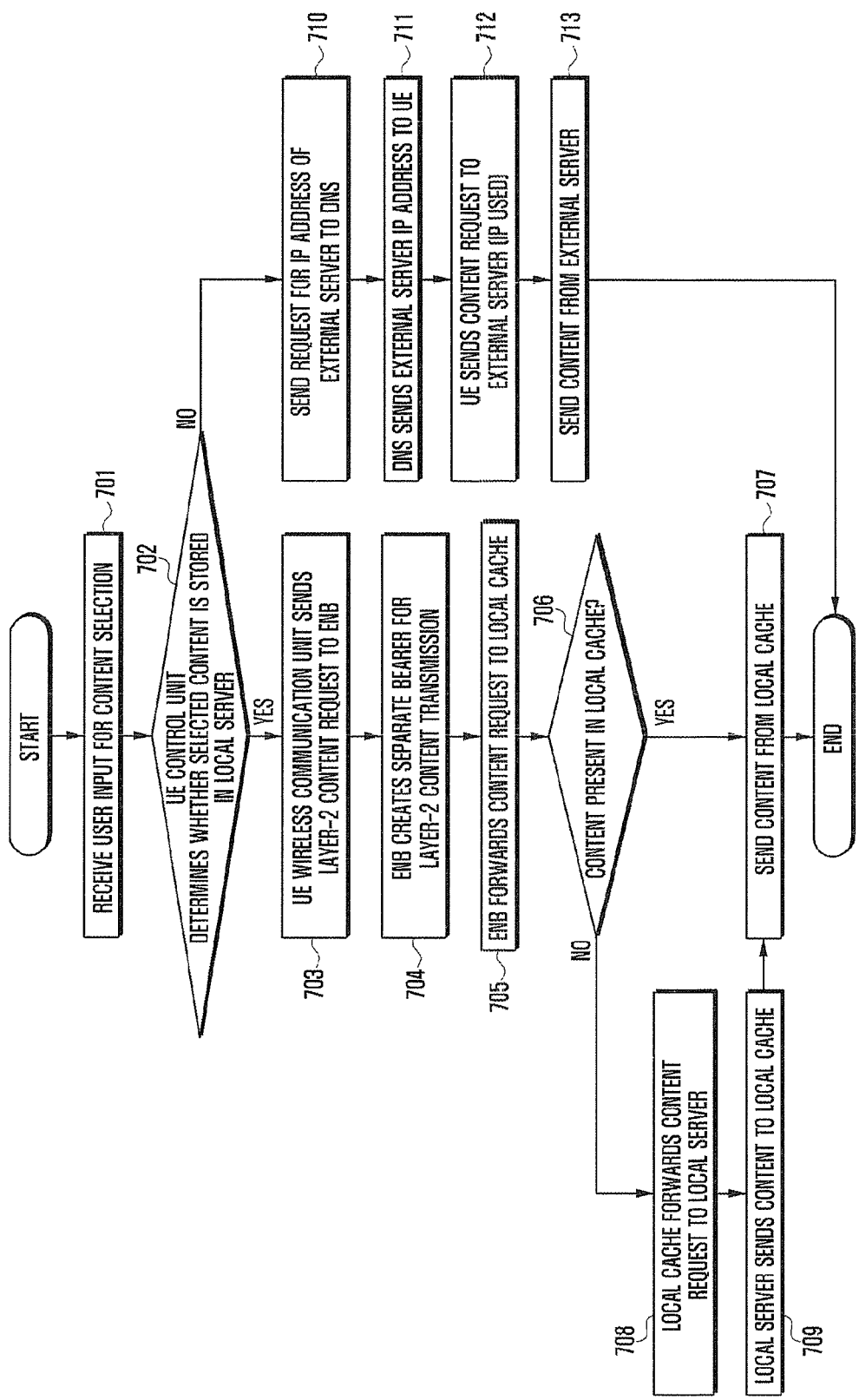
FIG. 7B is a flowchart of a procedure for content transmission according to the second embodiment of the present disclosure.

FIG. 7B is a flowchart of a procedure for content transmission according to the second embodiment of the present disclosure.

At operation 701, the UE 601 receives user input for selection of content. The UE 601 may receive user input for content selection through the touchscreen 750 or the key input unit 760.

At operation 702, the control unit 780 of the UE 601 determines whether the selected content is content stored in the local server 606 or the local cache 608 within the operator network. The control unit 780 may determine whether the selected content is provided by the local server 606 on the basis of at least one of the name, id tag or domain name of the selected content. For example, the UE 601 may be aware that content with domain name "*.samsung.com" is stored in the local server 606. In this case, if the selected content is content with domain name "*.samsung.com", the control unit 780 may determine that the selected content is present in the local server 606. To this end, the storage unit 770 may store a list of domain names associated with content stored in the local server 606. In addition, when content is stored in the local cache 608, the uniform resource locator (URL) of the content may be stored in the storage unit 770. Later, when the same content is requested, the control unit 780 may determine that the content is stored in the local cache 608.

If the selected content is determined to be content stored in the external server 603, the control unit 780 performs the same procedure as that for requesting and receiving content in an existing wireless network (operations 710 to 713). As operations 710 to 713 are identical or similar to operations 511 to 513 of FIG. 5 (related art technique), a detailed description thereof is omitted.

By contrast, if the selected content is determined to be content stored in the local server 606 or the local cache 608, the procedure proceeds to operation 703 at which the wireless communication unit 730 of the UE 601 sends a layer-2 content request message to the eNB 610. At operation 703, an RRC message may be used as a content request message sent by the UE 601 to the eNB 610. The IP protocol 205 or the TCP/UDP protocol 206 is not used for transmission of a content request message from the UE 601 to the eNB 610 or for transmission of corresponding content via the eNB 610 to the UE 601. Hence, headers for these protocols are omitted, and usage efficiency of transmission resources can be heightened. This is because both requesting of content and transmission of the requested content can be performed at layer 2.

At operation 704, upon reception of the content request message, the eNB 610 creates a separate bearer to send layer-2 content to the UE 601. At operation 705, the eNB 610 forwards the content request message to the local cache 608.

At operation 706, the local cache 608 determines whether content corresponding to the content request message is stored. If such content is stored, the local cache 608 proceeds to operation 707 at which the local cache 608 sends the content via the eNB 610 to the UE 601. If such content is not stored, the local cache 608 proceeds to operation 708 at which the local cache 608 forwards the content request message to the local server 606. At operation 709, the local server 606 sends content corresponding to the content request message to the local cache 608. At operation 707, the local cache 608 forwards the content received from the local server 606 to the UE 601.

FIG. 8 is a flowchart of a procedure for content transmission according to a third embodiment of the present disclosure.

In the second embodiment, the MME 620 is not involved in content transmission and only the UE 601 and eNB 610 are involved in content transmission. In the third embodiment of the present disclosure described in FIGS. 8 and 9, the MME 620 is involved in content requesting/transmission and bearer creation. Whether to use the MME 620 for layer-2 content transmission may be determined according to operator preferences.

Operations 801, 802, 806, 807, 808 and 809 in FIG. 8 correspond respectively to operations 701, 702, 706, 707, 708 and 709 in FIG. 7, and hence a detailed description thereof is omitted. Operations 810, 811, 812 and 813 in FIG. 8 correspond respectively to operations 710, 711, 712 and 713 in FIG. 7, and hence a detailed description thereof is omitted.

At operation 803, the wireless communication unit 730 of the UE 601 sends a layer-2 content request message to the MME 620. At operation 803, a NAS protocol message may be used as a content request message sent by the UE 601 to the eNB 610. At operation 804, the MME 620 creates a bearer to send layer-2 content to the UE 601. At operation 805, the MME 620 forwards the content request message to the local cache 608.

Figure 9:
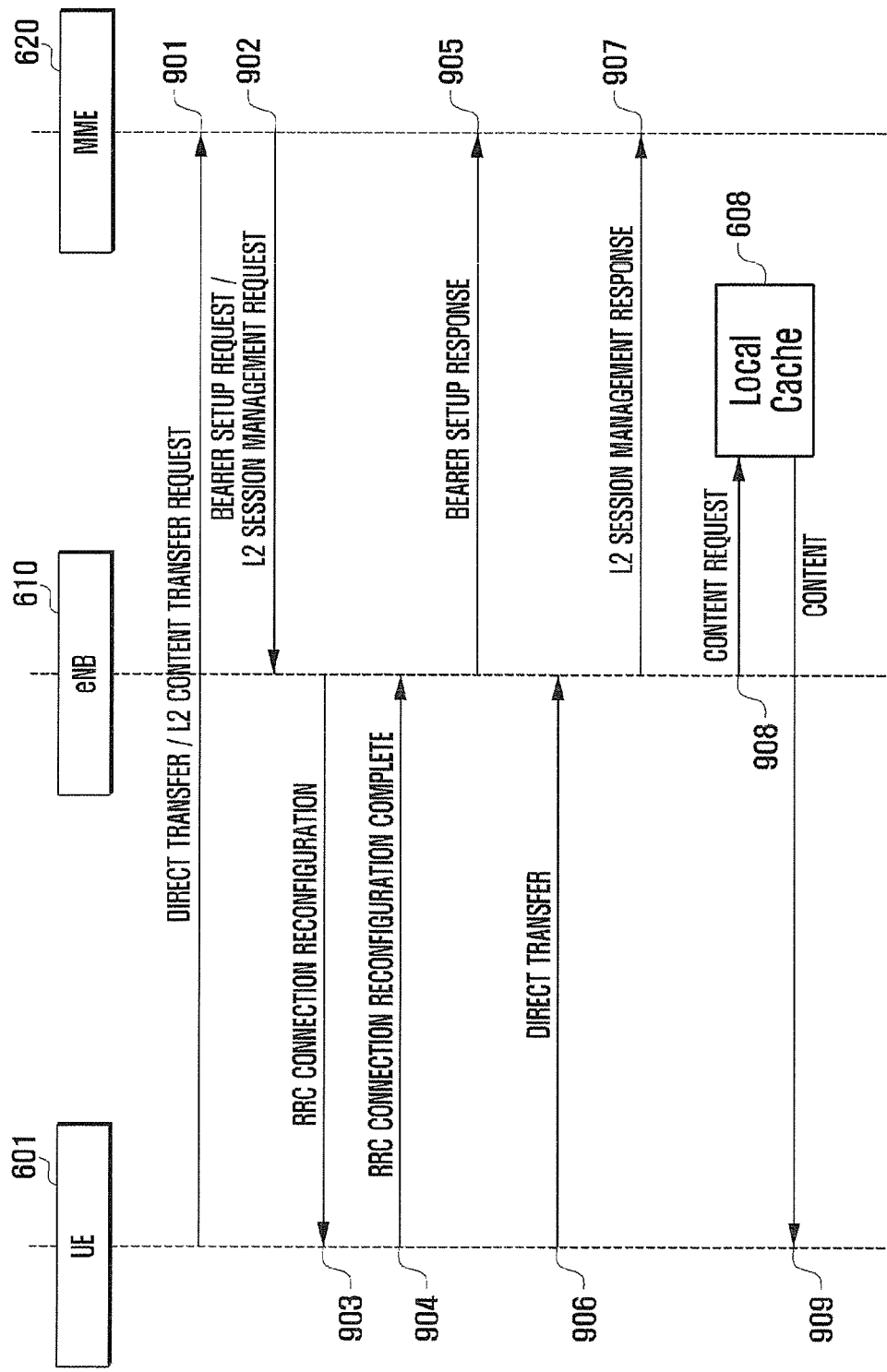
FIG. 9 illustrates exchange of messages between UE 601, eNB 610 and MME 620 at operations 803 to 806 in FIG. 8.

FIG. 9 illustrates exchange of messages between the UE 601, eNB 610 and MME 620 at operations 803 to 806 in FIG. 8.

At operation 901, to use layer-2 content transmission, the UE 601 sends a content request message via the eNB 610 to the MME 620. At operation 902, if layer-2 content transmission is available, the MME 620 sends a Bearer Setup Request message to the eNB 610 and sends a Layer-2 Session Management Request message to the UE 601. At operation 903, the eNB 610 sends a command to create a bearer for layer-2 transmission to the UE 601. At operation 904, after bearer creation, the UE 601 sends a response to the eNB 610. At operation 905, the eNB 610 sends a Bearer Setup Response message to the MME 620. At operation 906, the UE 601 performs direct transmission to the eNB 610. At operation 907, the eNB 610 sends a Layer-2 Session Management Response message to the MME 620. At operation 908, the eNB 610 sends a content request to the local cache 608. At operation 909, the eNB 610 receives content from the local cache 608 and forwards the content to the UE 601.

Figure 10:
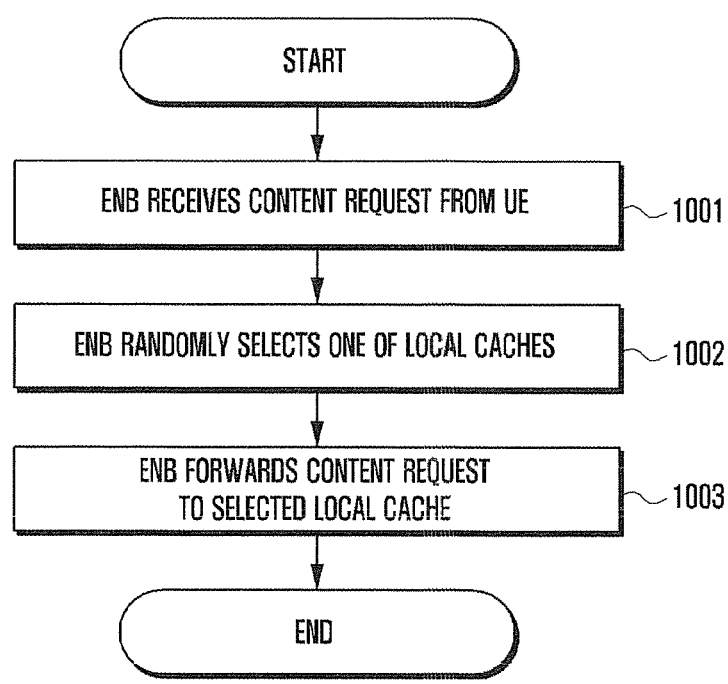
FIG. 10 is a flowchart of a procedure for local cache selection performed by eNB 610 according to a fourth embodiment of the present disclosure.

FIG. 10 is a flowchart of a procedure for local cache selection performed by the eNB 610 according to a fourth embodiment of the present disclosure.

For ease of description, the first to third embodiments deal with a basic case in which the eNB is connected with one local cache 608. However, in actual network deployment, one eNB 610 may be connected with multiple local caches according to operator preferences or network situations. If multiple local caches are connected to the eNB 610, the eNB 610 has to determine a local cache to which a content request is to be sent among the multiple local caches.

Referring to FIG. 10, at operation 1001, the eNB 610 receives a content request message from the UE 601. At operation 1002, the eNB 610 randomly selects one of connected local caches. At operation 1003, the eNB 610 forwards the content request message to the selected local cache. Operations after the content request message is sent to the local cache are identical to operations 506, 507, 508, 509 and 510 in FIG. 5, and hence a description thereof is omitted. As described above, the eNB 610 may randomly select one of multiple local caches to send content.

Figure 11:
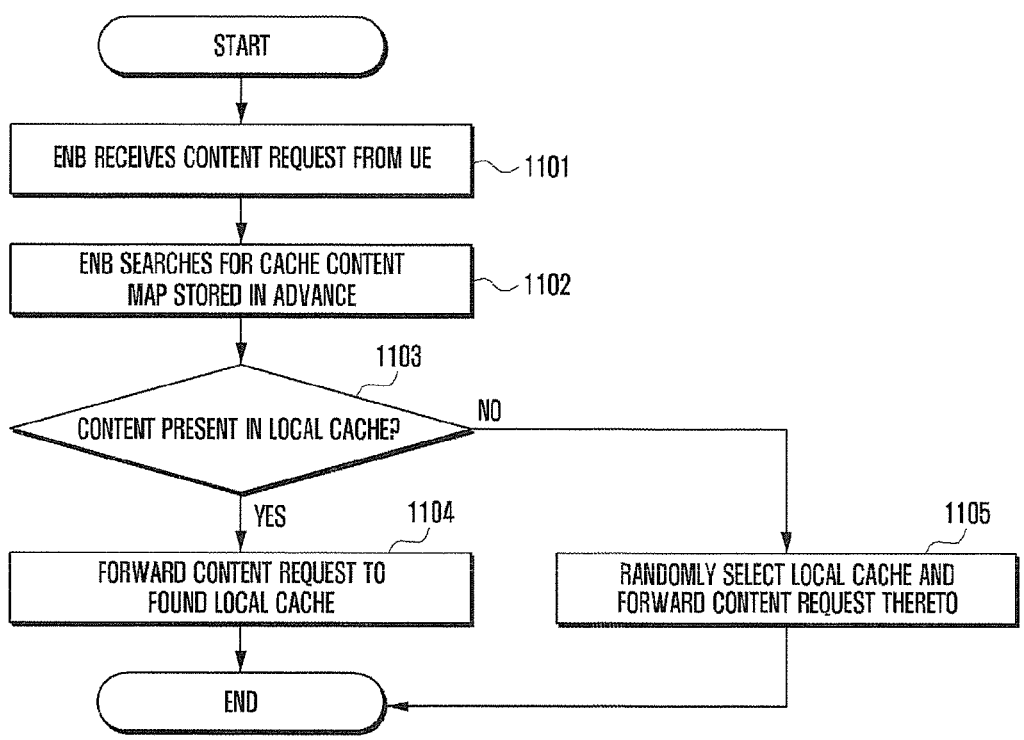
FIG. 11 is a flowchart of a procedure for local cache selection performed by eNB 610 according to a fifth embodiment of the present disclosure.

FIG. 11 is a flowchart of a procedure for local cache selection performed by the eNB 610 according to a fifth embodiment of the present disclosure.

In the fourth embodiment, a local cache is selected in a simple manner. However, as the eNB 610 does not know or consider content stored in a local cache in advance, inefficiency may be caused. For example, requested content may be stored in a local cache other than a local cache randomly selected by the eNB 610. In this case, the same content has to be retransmitted from the local server to the local caches owing to erroneous local cache selection by the eNB 610.

To address such a problem, the scheme described in FIG. 11 directs the eNB 610 to have information on content stored in the local caches.

At operation 1101, the eNB 610 receives a content request message from the UE 601. At operation 1102, the eNB 610 searches for a cache content map stored in advance. Here, the cache content map is a data structure storing information on content currently stored in each local cache. At operation 1103, the eNB 610 checks whether a local cache storing the requested content is found. If a local cache storing the requested content is found, the eNB 610 proceeds to operation 1104 at which the eNB 610 forwards the content request message to the found local cache. If a local cache storing the requested content is not found, the eNB 610 proceeds to operation 1105 at which the eNB 610 forwards the content request message to a local cache selected at random. Operations after the content request message is sent to the local cache are identical to operations 506, 507, 508, 509 and 510 in FIG. 5, and hence a description thereof is omitted.

When new content is stored in the local cache at operation 1105, the eNB 610 may update the cache content map of the local cache.

As described above, in the fifth embodiment, effective use of content currently present in the local caches may shorten transmission delay and efficiently reduce unnecessary data transmission between the local caches and the local server 606.

It is known to those skilled in the art that blocks of a flowchart and a combination of flowcharts may be represented and executed by computer program instructions. These computer program instructions may be loaded on a processor of a general purpose computer, a special computer or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module" or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose large components and units. Components and units may be configured to drive a device or one or more processors in a secure multimedia card.

Industrial Applicability

The above description is provided to assist in a comprehensive understanding of various embodiments of the present disclosure. It includes various specific details to assist in that understanding but these are to be regarded as merely exemplary. Accordingly, those of ordinary skill in the art will recognize that various changes and modifications of the embodiments described herein can be made without departing from the scope and spirit of the present disclosure.

Exemplary embodiments of the present disclosure have been described with reference to the accompanying drawings. Specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

The invention claimed is:

1. A method of content reception by a terminal in a mobile communication system, the method comprising:
    receiving, by the terminal, user input for content;
    determining, by the terminal, in response to receiving the user input for the content, whether the content is stored in a local server connected to a base station based on domain information stored in the terminal;
    transmitting, by the terminal, if the content is stored in the local server, a layer-2 type content request message for the content stored in the local server to the base station;
    transmitting, by the terminal, if the content is not stored in the local server, a transmission control protocol (TCP)/internet protocol (IP) type content request message for the content stored in the local server to the base station; and
    receiving, by the terminal, the content corresponding to the content request message from the base station.

2. The method of claim 1, wherein determining whether the content is stored in the local server comprises determining whether the content is provided by the local server on the basis of at least one of a name, id tag of the content.

3. The method of claim 1, further comprising
    transmitting, if the content is not stored in the local server, a TCP/IP content request message to an external server.

4. The method of claim 1, wherein transmitting the content request message comprises:
    sending, by the terminal, the content request message via the base station to a Mobility Management Entity (MME);
    sending, by the MME, in response to reception of the content request message, a bearer setup request message to the base station;
    sending, by the base station, in response to reception of the bearer setup request message, a bearer creation request to the terminal; and
    generating, by the terminal, in response to reception of the bearer creation request from the base station, a bearer and receiving content through the generated bearer.

5. The method of claim 1, wherein, in response to reception of the content request message, the base station determines whether content corresponding to the content request message is present in a local cache and, in response to the corresponding content being present in the local cache, retrieves the content from the local cache and sends the retrieved content to the terminal.

6. The method of claim 5, wherein, in response to the corresponding content not being present in the local cache, the base station receives the content from the local server and send the received content to the terminal.

7. The method of claim 5, wherein the base station is connected with multiple local caches and stores a list of content stored in the local caches, and wherein the base station finds a local cache that stores the corresponding content using the content list and retrieves the content from the found local cache.

8. The method of claim 1, wherein transmitting a content request message comprises sending a layer-2 content request message for the content stored in the local server to the base station.

9. A terminal for receiving content in a mobile communication system, the terminal comprising:
a transceiver configured to transmit and receive a signal; and
a controller configured to:
receive user input for content,
determine, in response to receiving the user input for the content, whether the content is stored in a local server connected to a base station based on domain information stored in the terminal,
transmit, if the content is stored in the local server, a layer-2 type content request message for the content stored in the local server to the base station,
transmit if the content is not stored in the local server, a transmission control protocol (TCP)/internet protocol (IP) type content request message for the content stored in the local server to the base station, and
receive the content corresponding to the content request message from the base station.

10. The terminal of claim 9, wherein the controller is configured to determine whether the content is provided by the local server on the basis of at least one of a name, id tag of the content.

11. The terminal of claim 9, wherein, if the content is not stored in the local server, the controller is configured to transmit a TCP/IP content request message to an external server.

12. The terminal of claim 9, wherein:
the controller is configured to send the content request message via the base station to a Mobility Management Entity (MME), and generate, in response to reception of a bearer creation request from the base station, a bearer and receives content through the generated bearer,
the MME is configured to send, in response to reception of the content request message, a bearer setup request message to the base station, and
the base station is configured to send, in response to reception of the bearer setup request message, a bearer creation request to the terminal.

13. The terminal of claim 9, wherein, in response to reception of a layer-2 content request message, the base station is configured to determine whether content corresponding to the content request message is present in a local cache and, in response to the corresponding content being present in the local cache, retrieves the content from the local cache and sends the retrieved content to the terminal.

14. The terminal of claim 13, wherein, in response to the corresponding content not being present in the local cache, the base station is configured to receive the content from the local server and send the received content to the terminal.

15. The terminal of claim 13, wherein the base station is connected with multiple local caches and is configured to store a list of content stored in the local caches, and
wherein the base station is configured to find a local cache that stores the corresponding content using the content list and retrieve the content from the found local cache.

16. The terminal of claim 9, wherein the controller is configured to send a layer-2 content request message to the base station.

17. A wireless communication system comprising:
a base station connected to a local server; and
a terminal configured to:
receive user input for content,
determine, in response to receiving the user input for the content, whether the content is stored in the local server based on a domain information stored in the terminal,
transmit, if the content is stored in the local server, a layer-2 type content request message to the base station,
transmit if the content is not stored in the local server, a transmission control protocol (TCP)/internet protocol (IP) type content request message for the content stored in the local server to the base station, and
receive content corresponding to the content request message from the base station.

18. The wireless communication system of claim 17, wherein the terminal is configured to determine whether the content is provided by the local server on the basis of at least one of a name, id tag of the content.

19. The wireless communication system of claim 17, wherein, if the content is not store din the local server, the terminal is configured to transmit a TCP/IP content request message to an external server.

20. The wireless communication system of claim 17, further comprising a Mobility Management Entity (MME), wherein:
the terminal is configured to send the content request message via the base station to a Mobility Management Entity (MME), and generate, in response to reception of a bearer creation request from the base station, a bearer and receives content through the generated bearer,
the MME is configured to send, in response to reception of the content request message, a bearer setup request message to the space station, and
the base station is configured to send, in response to reception of the bearer setup request message, a bearer creation request to the terminal.

\* \* \* \* \*